United States Patent
Stephan

(10) Patent No.: US 11,002,315 B2
(45) Date of Patent: May 11, 2021

(54) ROLLING BEARING HAVING ELECTRICAL INSULATING MATERIAL, AND MANUFACTURING PROCESS OF SUCH ROLLING BEARING

(71) Applicant: Aktiebolaget SKF, Gothenburg (SE)

(72) Inventor: Bernd Stephan, Schweinfurt (DE)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 16/376,007

(22) Filed: Apr. 5, 2019

(65) Prior Publication Data

US 2019/0323558 A1    Oct. 24, 2019

(30) Foreign Application Priority Data

Apr. 24, 2018 (DE) .................. 10 2018 206 242

(51) Int. Cl.
*F16C 19/52* (2006.01)
*F16C 33/78* (2006.01)
*F16C 19/16* (2006.01)
*F16C 33/60* (2006.01)

(52) U.S. Cl.
CPC .......... *F16C 33/7826* (2013.01); *F16C 19/16* (2013.01); *F16C 33/60* (2013.01); *F16C 2202/30* (2013.01)

(58) Field of Classification Search
CPC .......... F16C 19/06; F16C 19/16; F16C 19/52; F16C 41/002; F16C 41/004; H02K 5/173; H02K 5/1732; H02K 5/1735; H02K 5/1737

See application file for complete search history.

(56) References Cited

U.S. PATENT DOCUMENTS

| | | | |
|---|---|---|---|
| 1,513,295 A * | 10/1924 | Talley | F16C 19/08 384/564 |
| 2,367,017 A | 1/1945 | Gardiner | |
| 3,564,477 A * | 2/1971 | Pompei | F16J 15/3204 439/17 |
| 3,757,164 A | 9/1973 | Binkowski | |
| 4,511,837 A * | 4/1985 | Vermeiren | F16C 19/52 324/671 |
| 4,801,270 A | 1/1989 | Scarlata | |
| 5,166,565 A | 11/1992 | Katsuzawa | |
| 5,735,615 A | 4/1998 | Pontzer | |
| 5,812,908 A | 9/1998 | Larocca | |
| 5,961,222 A | 10/1999 | Yabe | |
| 6,102,574 A * | 8/2000 | Proschel | F16C 41/002 384/476 |

(Continued)

FOREIGN PATENT DOCUMENTS

| | | |
|---|---|---|
| DE | 19602951 A1 | 8/1997 |
| DE | 10137785 A1 | 2/2003 |

(Continued)

*Primary Examiner* — Phillip A Johnson
(74) *Attorney, Agent, or Firm* — Garcia-Zamor Intellectual Property Law; Ruy Garcia-Zamor; Bryan Peckjian

(57) ABSTRACT

A rolling bearing having an annular inner ring and an annular outer ring in relative rotation around a central axis and rolling elements housed between raceways provided in the two rings. At least one of the rings includes two concentric annular ring parts made of metallic material, and an annular layer made of electrically insulating material, the layer being accommodated between the two parts.

12 Claims, 6 Drawing Sheets

(56) References Cited

U.S. PATENT DOCUMENTS

| | | | |
|---|---|---|---|
| 7,097,362 | B2 | 8/2006 | Inukai |
| 7,193,836 | B2 | 3/2007 | Oh |
| 7,339,777 | B2 | 3/2008 | Barnard |
| 7,503,697 | B2 | 3/2009 | Tsuji |
| 8,172,463 | B2 | 5/2012 | Nakajima |
| 9,206,841 | B2 | 12/2015 | Cordier |
| 9,464,672 | B2 * | 10/2016 | White .................. F16C 33/3806 |
| 9,570,953 | B2 * | 2/2017 | Sato ..................... H02K 5/1732 |
| 9,581,203 | B2 * | 2/2017 | White ................... F16C 41/002 |
| 10,253,818 | B1 * | 4/2019 | Ince ........................ F16C 19/52 |
| 2003/0086630 | A1 | 5/2003 | Bramel |
| 2004/0184215 | A1 | 9/2004 | Oh |
| 2005/0094910 | A1 * | 5/2005 | Tsuji ....................... F16C 19/52 |
| | | | 384/476 |
| 2006/0007609 | A1 | 1/2006 | Oh |
| 2006/0210206 | A1 * | 9/2006 | Ihata ....................... F16C 19/52 |
| | | | 384/446 |
| 2011/0030503 | A1 | 2/2011 | Ehinger |
| 2014/0111046 | A1 | 4/2014 | Murikipudi |
| 2015/0047349 | A1 | 2/2015 | Palko |
| 2015/0256054 | A1 | 9/2015 | Northwall |

FOREIGN PATENT DOCUMENTS

| | | | |
|---|---|---|---|
| DE | 202004013642 U1 | 11/2004 | |
| DE | 202004013645 U1 | 2/2005 | |
| DE | 202013102753 U1 | 9/2014 | |
| DE | 202014105015 U1 | 10/2014 | |
| WO | WO-2011019136 A2 * | 2/2011 | ............. F16C 35/07 |
| WO | 2013/174446 A1 | 11/2013 | |

* cited by examiner

ROLLING BEARING HAVING ELECTRICAL INSULATING MATERIAL, AND MANUFACTURING PROCESS OF SUCH ROLLING BEARING

CROSS-REFERENCE

This application claims priority to German patent application no. 102018206242.0 filed on Apr. 24, 2018, the contents of which are fully incorporated herein by reference.

TECHNOLOGICAL FIELD

The present invention relates to the technical field of rolling bearings, in particular to rolling bearings having an inner ring and an outer ring in relative rotation each other, and at least one row of rolling elements arranged between raceways provided in the two rings. The invention concerns more particularly rolling bearings for use in electrical motors for industry or automotive applications.

BACKGROUND

Typically, a rolling bearing may be mounted in a frame of an electric motor or machine to support a rotary shaft. When the shaft rotates, a difference in electrical potential can arise between the shaft and the electric motor or machine. This in turn creates an electrical potential between a rotating bearing ring connected to the shaft, and a fixed bearing ring connected directly or indirectly to the frame. The potential difference can lead to a discharge of current through the rolling bearing. This problem is of particular concern in AC electric motors, especially when the alternating current is produced by pulse-width modulation techniques.

Current passing through a rolling bearing can damage the raceways and the rolling elements of bearing. Lubricating oil of bearing may be blackened, and then decrease the lubrication characteristics of bearing, that can lead to rings and rolling elements were and failure. Electrical discharges can also create vibrations which increase the acoustical noise of system. In addition, high frequency circulating currents produced by the potential difference can induce electromagnetic noise that may adversely affect external electric devices.

It is known to ground a rotating shaft by using a grounding brush having conductive fibers, fibers of cooper or carbon for example. However, the configuration of conventional grounding brush assemblies generally must be specific to the size and shape of the shaft and housing to be grounded. It increases the cost and the mounting process duration of the electric motor assembly.

It would therefore be desirable to electrically insulate a rolling bearing by alternate solutions that are cost effective and easy to install.

SUMMARY

These and other problems are addressed by embodiments of the present invention.

To this end, the invention relates to a rolling bearing comprises an annular inner ring and an annular outer ring in relative rotation around a central axis, and rolling elements housed between raceways provided in the two rings.

According to the invention, at least one of the rings comprises two concentric annular ring parts made of metallic material, and an annular layer made of electrically insulating material, the layer being accommodated between cylindrical surfaces of the two ring parts.

According to further aspects of the invention which are advantageous but not compulsory, such a rolling bearing may incorporate one or several of the following features:

The rolling elements are balls.

The rolling bearing further comprises an annular cage that circumferentially maintains the rolling elements.

The layer is made of elastomeric material, for example rubber, thermoplastic, duroplastic material, with or without fiber fillers.

The cylindrical surface of one of the ring parts is provided with a circumferential groove.

The cylindrical surface of the other ring part is provided with a circumferential protruding portion directed towards the groove.

The circumferential groove is toroidal.

The circumferential protruding portion is toroidal.

The circumferential groove, in cross-section through the central axis, is centered on the radial plane passing through the geometrical centers of balls.

The rolling bearing is provided with a brush made of electrically conductive material. The brush is fixed to a first ring, and in sliding contact with a ring part of a second ring, the ring part being radially opposite to the first ring with respect to a layer made of electrically insulating material.

The brush is fixed to a first axially protruding portion that axially extends from the first ring.

The first ring and the first axially protruding portion are formed integral.

The first axially protruding portion is provided to a support to which the first ring is fixed.

The brush is in sliding contact with a second axially protruding portion that axially extends from the ring part of second ring.

The ring part of second ring and the second axially protruding portion are formed integral.

The second axially protruding portion is provided to a support to which the ring part of second ring is fixed.

The first ring is fixed, and the second ring is rotating.

The invention also concerns an electric motor comprising a fixed motor frame or housing, a rotary shaft of central axis, and at least one rolling bearing according to any of the previous embodiments, the first ring of rolling bearing being connected to the fixed motor frame or housing, and the second ring of rolling bearing being connected to the rotary shaft.

The invention also relates to a manufacturing process of a rolling bearing according to any of the preceding claims, and comprising the following steps:

(a) a tube in elastomeric material is vulcanized in a separate molding tool; and (b) the elastomeric tube has the surfaces oiled;

(c) the elastomeric tube is pressed between two ring parts of one of the rings to form a layer.

An alternate manufacturing process comprises the following steps:

(a) two ring parts of one of the rings are arranged concentrically with a radial space in-between;

(b) a heated elastomeric material in a liquid form is injected in the radial space;

(c) the elastomeric material is vulcanized under specific pressure and temperature conditions between the ring parts to form a layer.

BRIEF DESCRIPTION OF THE DRAWINGS

The invention will now be explained in correspondence with the annexed figures, as illustrative examples, without restricting the object of the invention, in which.

DETAILED DESCRIPTION

Figure 1:
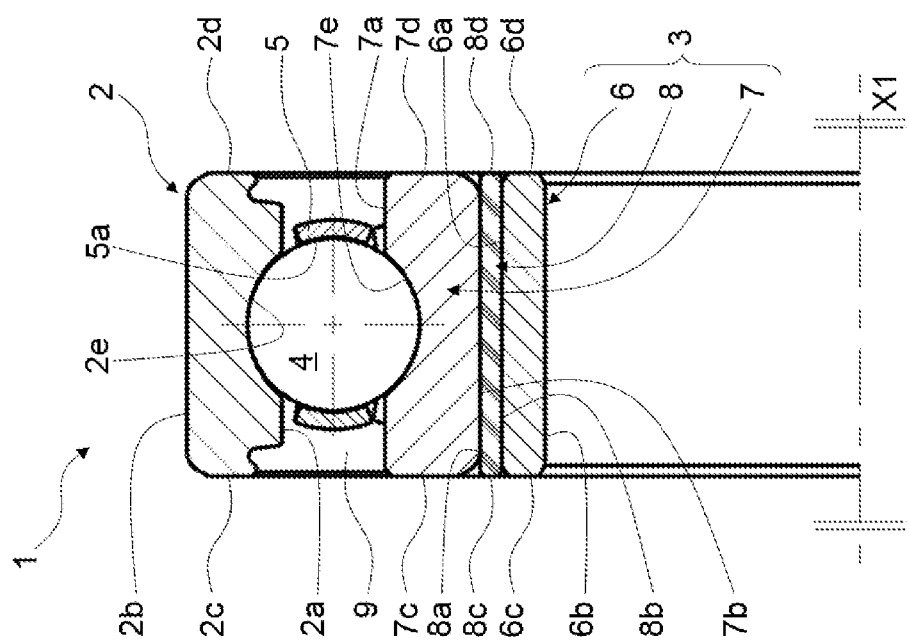
FIG. 1 is an axial half-section of a rolling bearing according to a first embodiment of the invention.

The FIG. 1 illustrates a rolling bearing 1 with central axis X1. The rolling bearing 1 comprises an outer ring 2, an inner ring 3, and a row of rolling elements 4, here balls, arranged in parallel planes held by a cage 5.

The rings 2, 3 are coaxial with the central axis X1 in the normal operating mode.

The outer ring 2 if formed integral and comprises an outer cylindrical surface 2a, a cylindrical bore 2b wherein a raceway 2e is formed for the rolling elements 4, and two lateral surfaces 2c, 2d.

The raceway 2e is a toroidal groove of shape adapted to receive balls 4.

The outer ring 2 is a fixed ring and is dedicated to be mounted in a frame or housing (not illustrated) of an electric motor, for example.

In this embodiment, the inner ring 3 comprises a first ring part 6, a second ring part 7, and a layer 8 accommodated between the parts 6, 7.

The first ring part 6 comprises an outer cylindrical surface 6a, a cylindrical bore 6b, and two lateral surfaces 6c, 6d.

The bore 6b of first ring part 6 is dedicated to be mounted onto an outer cylindrical surface of a rotary shaft (not illustrated), for example.

The second ring part 7 comprises an outer cylindrical surface 7a wherein a raceway 7e is formed for the rolling elements 4, a cylindrical bore 7b, and two lateral surfaces 7c, 7d.

The raceway 7e is a toroidal groove of shape adapted to receive balls 4.

The first ring part 6 and the second ring part 7 are made of a metallic material, and are concentric with respect to the central axis X1.

The layer 8 is radially accommodated in a radial space defined between the outer cylindrical surface 6a of first ring part 6, and the cylindrical bore 7b of second ring part 7. Therefore the layer 8 comprises an outer cylindrical surface 8a fixed to the cylindrical bore 7b of second ring part 7, a cylindrical bore 8b fixed to the outer cylindrical surface 6a of first ring part 6, and two lateral surfaces 8c, 8d.

The layer 8 is made of an electrically insulating material. Advantageously, the layer 8 is made of elastomeric material, for example rubber, thermoplastic, duroplastic material, with or without fiber fillers. The selection of hardness of layer material may vary depending on the application and the required axial and radial stiffness of the bearing 1.

According to one aspect of the invention, the layer 8 is formed by the injection of heated elastomeric material in liquid form in the radial space defined between the two concentric ring parts 6, 7. The elastomeric material is then vulcanized under specific pressure and temperature conditions between the ring parts. The elastomeric material is then tightly attached to the surfaces 6a, 7b of the parts 6, 7, and the two ring parts 6, 7 are firmly connected one another.

According to an alternate manufacturing process, a tube in elastomeric material may be vulcanized in a separate molding tool. The vulcanized elastomeric material has its surfaces oiled. The elastomeric tube is then pressed between two ring parts 6, 7 to form the layer 8.

The inner ring 3 has a sandwich structure provided with a cylindrical bore 6b dedicated to be mounted on a rotary shaft, a cylindrical outer surface 7a wherein a raceway 7e is provided for the rolling elements 4, and is provided with an electrically insulating layer.

Advantageously, the lateral surfaces 6c, 7c, 8c are axially aligned. Advantageously, the lateral surfaces 6d, 7d, 8d are also axially aligned.

Advantageously, the aligned lateral surfaces 6c, 7c, 8c of inner ring 3 are axially aligned with the lateral surface 2c of outer ring 2. Advantageously, the aligned lateral surfaces 6d, 7d, 8d of inner ring 3 are also axially aligned with the lateral surface 2d of outer ring 2.

As an alternate embodiment not illustrated, at least one of the lateral surfaces 8c and/or 8d of layer may be slightly axially shifted with respect to the other lateral surfaces 6c, 7c and/or 6d, 7d of first ring part 6 and second ring part 7, respectively. Therefore, a bump of elastomeric material can be formed on at least one radial side of inner ring 3 so as to permit an axial preload of inner ring 3 when mounted.

The cylindrical outer surface 7a of the second ring part 7 of inner ring 3, and the cylindrical bore 2b of the inner ring 2 define a bearing chamber 9 wherein the rolling elements 4 are in motion between the rings 2, 3. Advantageously, the bearing chamber 9 may be closed by sealing means (not illustrated) between the rings 2, 3. Advantageously, the bearing chamber 9 may be filled with lubricant, e.g. grease or oil, to reduce friction between the contact surfaces of moving components, here the rolling elements 4, the raceway 7e provided at the cylindrical outer surface 7a and the raceway 2e provided at the bore 2b of the inner ring 2.

The cage 5 comprises a plurality of cavities 5a designed to house the balls 4 and keep them uniformly circumferentially spaced. The cavities 5a are advantageously of spherical shape.

Thanks to the invention, the layer 8 is able to electrically insulate the inner ring 3, and then to prevent the current flow from a rotary shaft to a housing or frame through the rolling elements 4 and the outer ring 2.

Another advantage of the invention is that the layer 8 forms a vibration damper that partly decoupled the ring parts. More particularly, the critical bending resonance of rotary shaft at high speed could be damped. Therefore noise is also highly decreased.

Alternatively, the inner ring 3 may be non-rotating and the outer ring 2 rotating, or both rings can be rotating relative to each other.

Alternatively, the rolling bearing 1 may comprise more than one row of rolling elements 4.

Alternatively, the rolling bearing 1 may comprise any other type of rolling elements, such as tapered rollers, cylindrical rollers, needles.

Figure 2:
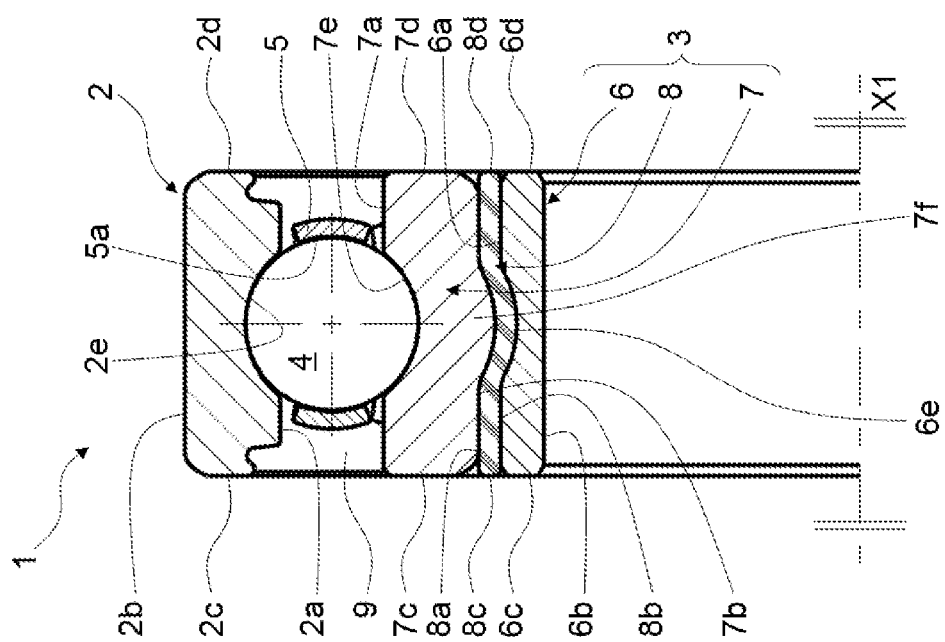
FIG. 2 is an axial half-section of a second embodiment.

A second embodiment of the invention is illustrated in FIG. 2, on which similar parts have the same references, and differs from the previous embodiment in that the first ring part 6 of inner ring 3 comprises a circumferential groove 6e.

The outer cylindrical surface 6b of first ring part 6 is provided with a circumferential groove 6e. Groove 6e is machined in the metallic material of first ring part 6. Groove 6e is concave and of toroidal shape, i.e. the groove 6e is arc-circle shaped in cross section passing through the central axis X1.

Advantageously, groove 6e in cross-section through the central axis, is centered on the radial plane passing through the geometrical centers of balls 4. Groove 6e is axially arranged between two cylindrical surfaces.

The cylindrical bore 7b of second ring part 7 is provided with a portion 7f that radially downwardly protrudes towards the groove 6e of first ring part 6. Protruding portion 7f is convex and of toroidal shape, i.e. the portion 7f is arc-circle shaped in cross section passing through the central axis X1.

Advantageously, portion 7f in cross-section through the central axis, is centered on the radial plane passing through the geometrical centers of balls 4. Portion 7f is axially arranged between two cylindrical surfaces.

The layer 8 is radially accommodated in a radial space defined between the first and second ring parts 6, 7. More precisely, the layer 8 is radially arranged between the cylindrical surfaces 6a, 7b of first and second ring parts 6, 7, and between the circumferential toroidal groove 6e and the circumferential toroidal protruding portion 7f of first and second ring parts 6, 7, respectively. The layer 8 is of corresponding shape with the first and second ring parts 6, 7.

Thanks to the bended shape of layer 8, and of the connecting surfaces 6a, 7b and 6e, 7f of the two ring parts 6, 7, respectively, the axial and radial stiffness of inner ring 3 is increased.

Figure 3:
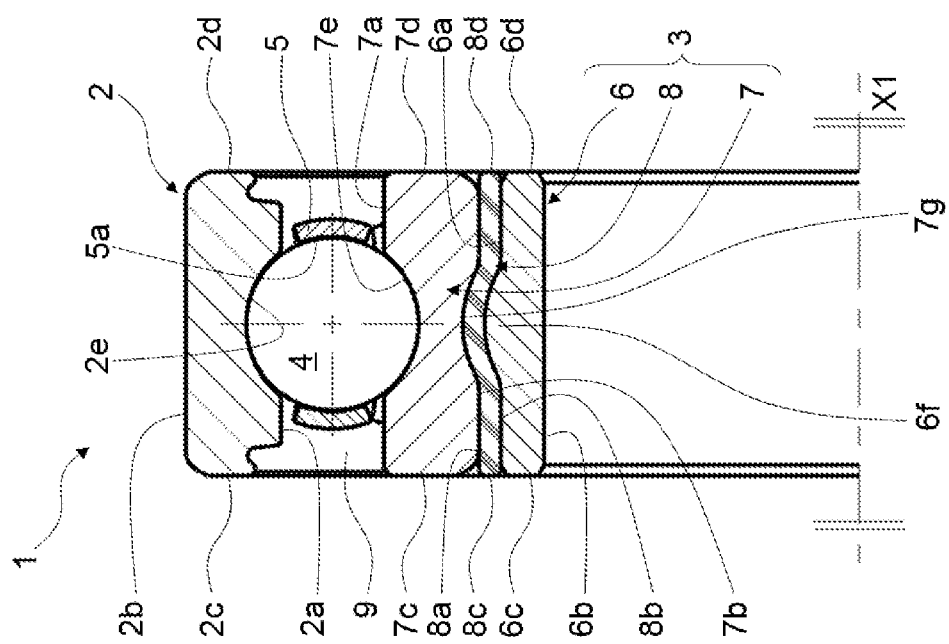
FIG. 3 is an axial half-section of a third embodiment.

A third embodiment of the invention is illustrated in FIG. 3, on which similar parts have the same references, and differs from the previous embodiments in that the second ring part 7 of inner ring 3 comprises a circumferential groove 7g.

The cylindrical bore 7b of second ring part 7 is provided with a circumferential groove 7g. Groove 7g is machined in the metallic material of second ring part 7. Groove 7g is concave and of toroidal shape, i.e. the groove 7g is arc-circle shaped in cross section passing through the central axis X1.

Advantageously, groove 7g in cross-section through the central axis, is centered on the radial plane passing through the geometrical centers of balls 4. Groove 7g is axially arranged between two cylindrical surfaces.

The outer cylindrical surface 6a of first ring part 6 is provided with a portion 6f that radially upwardly protrudes towards the groove 7g of second ring part 7. Protruding portion 6f is convex and of toroidal shape, i.e. the portion 6f is arc-circle shaped in cross section passing through the central axis X1.

Advantageously, portion 6f in cross-section through the central axis, is centered on the radial plane passing through the geometrical centers of balls 4. Portion 6f is axially arranged between two cylindrical surfaces.

The layer 8 is radially accommodated between the first and second ring parts 6, 7. More precisely, the layer 8 is radially arranged between the cylindrical surfaces 6a, 7b of first and second ring parts 6, 7, and between the circumferential toroidal protruding portion 6f and the circumferential toroidal groove 6g of first and second ring parts 6, 7, respectively. The layer 8 is of corresponding shape with the first and second ring parts 6, 7.

Figure 4:
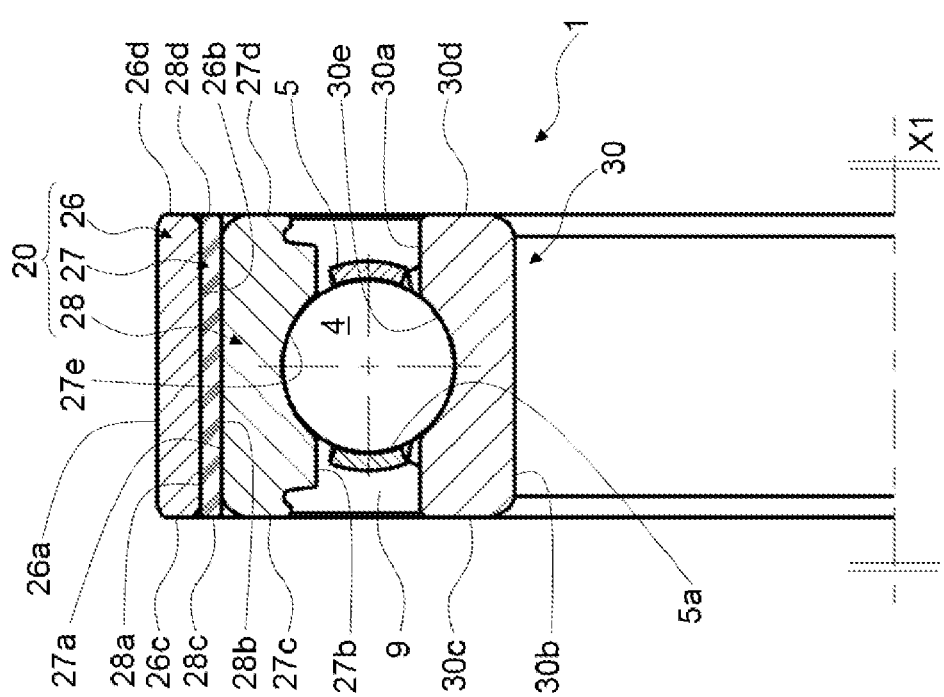
FIG. 4 is an axial half-section of a fourth embodiment.

A fourth embodiment of the invention is illustrated in FIG. 4, on which similar parts have the same references, and differs from the previous embodiments in that the rolling bearing 1 comprises an outer ring 20 having a first ring part 26, a second ring part 27, and a layer 28 accommodated between the parts 26, 27.

In this embodiment, the rolling bearing 1 comprises an outer ring 30 that is formed integral and comprises an outer cylindrical surface 30a wherein a raceway 30e is formed for the rolling elements 4, a cylindrical bore 30b, and two lateral surfaces 30c, 30d.

The inner ring 20 comprises a first ring part 26 having an outer cylindrical surface 26a, a cylindrical bore 26b, and two lateral surfaces 26c, 26d.

The second ring part 27 comprises an outer cylindrical surface 27a wherein a raceway 27e is formed for the rolling elements 4, a cylindrical bore 27b, and two lateral surfaces 27c, 27d.

The first ring part 26 and the second ring part 27 are made of a metallic material and are concentric with respect to the central axis X1.

The layer 28 is radially accommodated between the cylindrical bore 26b of first ring part 26, and the outer cylindrical surface 27a of second ring part 27. Therefore, the layer 28 comprises an outer cylindrical surface 28a fixed to the cylindrical bore 26b of first ring part 26, a cylindrical bore 28b fixed to the outer cylindrical surface 27a of second ring part 7, and two lateral surfaces 28c, 28d.

The layer 28 is made of an electrically insulating material. Advantageously, the layer 28 is made of elastomeric material.

The outer ring 2 has a sandwich structure provided with an outer cylindrical surface 26a, a cylindrical bore 27b wherein a raceway 27e is provided for the rolling elements 4, and is provided with an electrically insulating layer Advantageously, the lateral surfaces 26c, 27c, 28c are axially aligned. Advantageously, the lateral surfaces 26d, 27d, 28d are also axially aligned.

Advantageously, the aligned lateral surfaces 26c, 27c, 28c of outer ring 20 are axially aligned with the lateral surface 30c of inner ring 30. Advantageously, the aligned lateral surfaces 26d, 27d, 28d of outer ring 20 are also axially aligned with the lateral surface 30d of inner ring 30.

As alternate embodiments not illustrated, and similarly to the embodiments illustrated in FIGS. 2 and 3, one of the ring parts 26, 27 of outer ring 20 may comprise a circumferential toroidal groove, the other ring part comprising a circumferential toroidal protruding portion that extends radially towards the groove.

Figure 5:
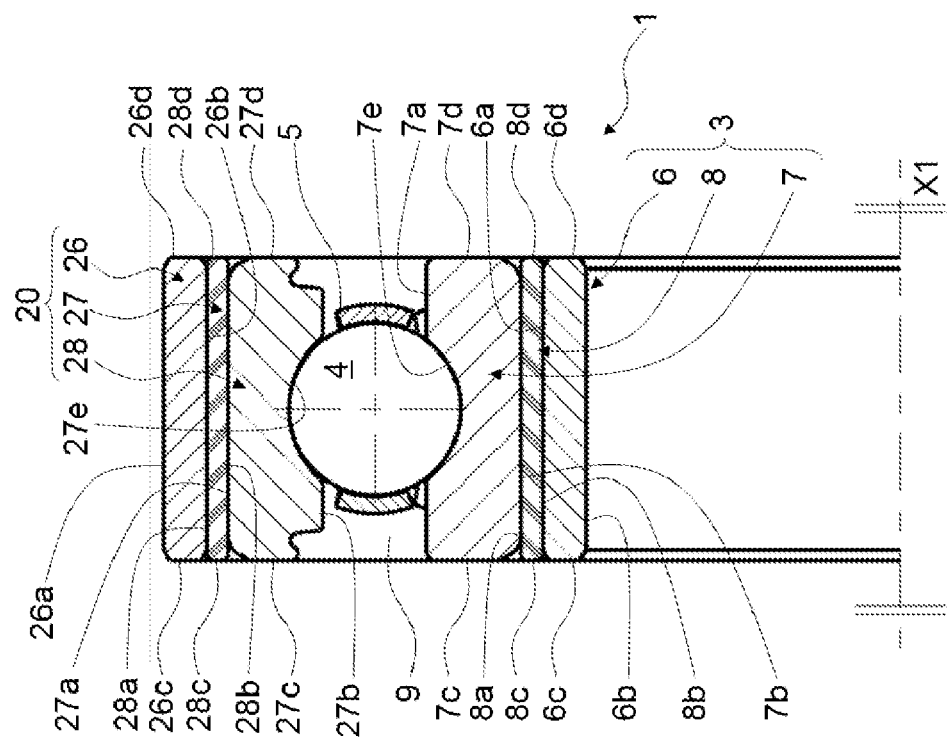
FIG. 5 is an axial half-section of a fifth embodiment.

In a fifth embodiment of the invention is illustrated in FIG. 5, on which similar parts have the same references, the rolling bearing 1 comprises an outer ring 20 having a first ring part 26, a second ring part 27, and a layer 28 accommodated between the parts 26, 27 such as illustrated in FIG. 4, and an inner ring 3 having a first ring part 6, a second ring part 7, and a layer 8 accommodated between the parts 6, 7 such as illustrated in FIG. 1.

Figure 6:
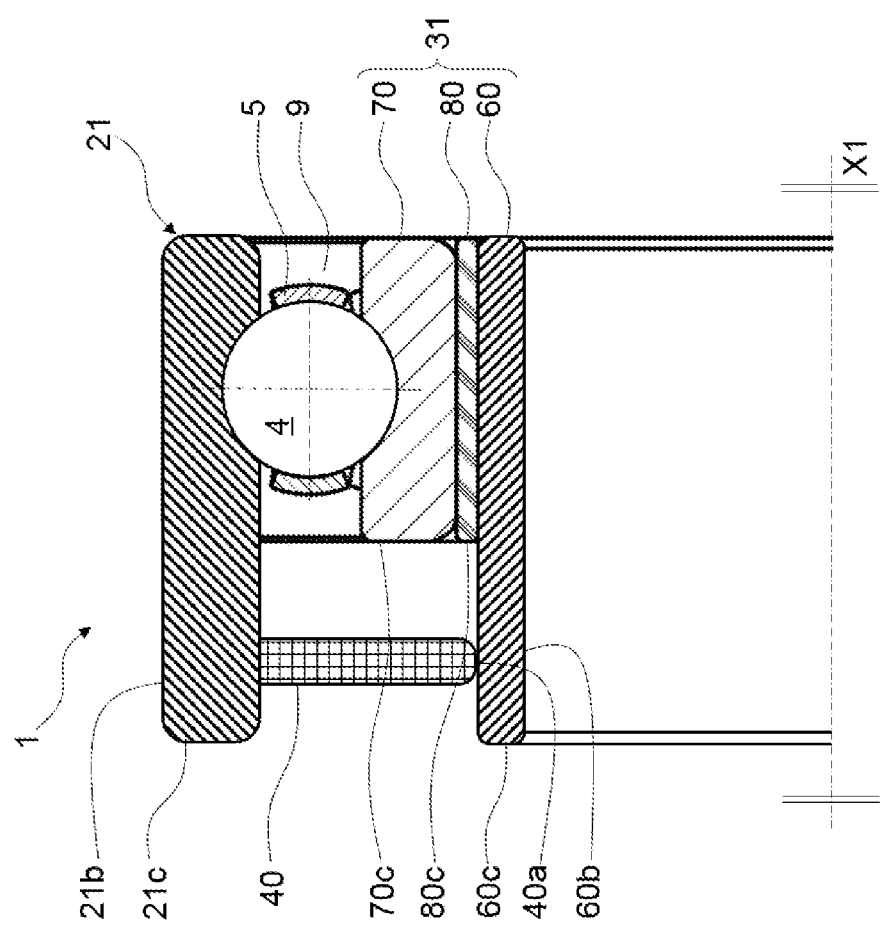
FIG. 6 is an axial half-section of a sixth embodiment.

A sixth embodiment of the invention is illustrated in FIG. 6, wherein a rolling bearing 1 is provided with a brush 40.

The brush 40 is made of electrically conductive material, the brush having for example conductive fibers, fibers of cooper or carbon.

The brush 40 is fixed to an outer ring 21 of rolling bearing 1. The outer ring 21 is dedicated to be fixed to a motor frame or housing, the outer cylindrical surface 21b of outer ring 21 being mounted in a bore of the frame or housing.

The outer ring 21 further comprises a lateral surface 21c. The lateral surface 21c of outer ring is axially shifted with respect to the lateral surfaces 70c, 80c. The outer ring 21 defines then an outer axially protruding portion.

As an alternate not illustrated, the rolling bearing may further comprise a sleeve fixed to the outer ring and to the motor frame or housing, the sleeve forming an outer axially protruding portion with respect to the outer ring.

The brush 40 has a free end 40a in sliding contact with an inner ring 31 of the rolling bearing 1.

The inner ring 31 has a first ring part 60, a second ring part 70, and a layer 80 accommodated between the parts 60, 70.

The ring parts 60, 70 are made of a metallic material.

The second ring part 70 is provided with an outer cylindrical surface having a raceway for the rolling elements 40.

The first ring part 60 is provided with a cylindrical bore 60b dedicated to be mounted onto a rotary shaft.

The layer 80 is made of an electrically insulating material and is accommodated between an inner cylindrical surface of second ring part 70, and an outer cylindrical surface of first ring part 60.

The first ring part 6 has a lateral surface 60c that is axially shifted with respect to the lateral surfaces 70c, 80c. The first ring part 60 defines then an inner axially protruding portion.

The outer axially protruding portion of outer ring 21 radially surrounds the inner axially protruding portion of first ring part 60 of inner ring 31. The brush 40 radially extends in the radial space defined between the outer and inner axially protruding portions, the brush 40 being fixed to the outer portion and in sliding contact with the inner portion.

The first ring part 60 is radially opposite to the outer ring 21 with respect to the layer 80. The brush then forms a passage means for the current, the other passage through the second ring part 70 being insulated by the electrically insulating layer 80.

Thanks to the invention, the electrical current passes from the rotary shaft to the motor frame or housing through successively the first ring part 60, the brush 40, and then the outer ring 21.

In the alternate case in which the outer ring 2 if fixed to a sleeve, the electrical current passes from the rotary shaft to the first ring part 60, the brush 40, and then the sleeve.

In any case, the layer 80 prevents the current to pass through the second ring part 70, the inner raceway, the rolling elements 4, the outer raceway, and then the outer ring 2.

The rolling bearing 1 can be formed as an assembled product easy to transport, handle, and install.

As alternate embodiments not shown, the rolling bearing 1 may be provided with similar technical features to any of the embodiments illustrated in FIGS. 2 to 5, the brush extending between the inner and outer rings so as to prevent the current passage through the raceways and rolling elements, these portions being insulated by one or two electrically insulating layers.

Representative, non-limiting examples of the present invention were described above in details with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved rolling bearing.

Moreover, various features of the above-described representative examples, as well as the various independent and dependent claims below, may be combined in ways that are not specifically and explicitly enumerated in order to provide additional useful embodiments of the present teachings.

What is claimed is:

1. A rolling bearing comprising:
an annular inner ring, and
an annular outer ring in relative rotation around a central axis, and
rolling elements housed between raceways provided in the two rings,
wherein at least one of the inner ring and the outer ring comprises two concentric annular ring parts made of metallic material, and an annular layer made of electrically insulating material, the layer being accommodated between cylindrical surfaces of the two ring parts;
wherein the cylindrical surface of a first one of the two ring parts is provided with a circumferential groove; and
wherein the cylindrical surface of a second one of the two ring parts is provided with a circumferential protruding portion directed towards the groove.

2. The rolling bearing according to claim 1, wherein the circumferential protruding portion is toroidal.

3. The rolling bearing according to claim 1, wherein the layer is made of elastomeric material.

4. The rolling bearing according to claim 1, further comprising a cage, wherein the rolling elements are held by the cage.

5. The rolling bearing according to claim 1, wherein the circumferential groove is toroidal.

6. A manufacturing process of a rolling bearing, the rolling bearing including an annular inner ring, and an annular outer ring in relative rotation around a central axis, and rolling elements housed between raceways provided in the two rings, wherein at least one of the inner ring and the outer ring comprises two concentric annular ring parts made of metallic material, and an annular layer made of electrically insulating material, the layer being accommodated between cylindrical surfaces of the two ring parts, the manufacturing process comprising the following steps:
(a) a tube in elastomeric material is vulcanized in a separate molding tool; and
(b) the elastomeric tube has the surfaces oiled;
(c) the elastomeric tube is pressed between two ring parts of one of the rings to form a layer.

7. The manufacturing process of the rolling bearing according to claim 6, further comprising the following steps:
(a) the two ring parts of one of the rings the inner ring and the outer ring are arranged concentrically with a radial space in between;
(b) a heated elastomeric material in a liquid form is injected in the radial space;
(c) the elastomeric material is vulcanized under specific pressure and temperature conditions between the ring parts to form a layer.

8. The manufacturing process of the roller bearing according to claim 6, wherein the cylindrical surface of a first one of the ring parts is provided with a circumferential groove.

9. A rolling bearing comprising:
an annular inner ring, and
an annular outer ring in relative rotation around a central axis, and
rolling elements housed between raceways provided in the two rings, wherein
at least one of the inner ring and the outer ring comprises two concentric annular ring parts made of metallic material, and an annular layer made of electrically insulating material, the layer being accommodated between cylindrical surfaces of the two ring parts,
wherein the rolling bearing is provided with a brush made of electrically conductive material, the brush being fixed to a first axially protruding portion that axially extends from one of the inner ring and the outer ring, and in sliding contact with a second axially protruding portion that axially extends from a ring part of the other of the inner ring and the outer ring, the ring part being radially opposite to the one of the inner ring and the outer ring with respect to the layer made of electrically insulating material.

10. The rolling bearing according to claim 9, further comprising a cage, wherein the rolling elements are held by the cage.

11. The rolling bearing according to claim 9, wherein the circumferential groove is toroidal.

12. The rolling bearing according to claim 9, wherein the layer is made of elastomeric material.

* * * * *